(12) United States Patent
Truninger

(10) Patent No.: US 6,379,119 B1
(45) Date of Patent: Apr. 30, 2002

(54) HYBRID ELECTRIC AND HYDRAULIC ACTUATION SYSTEM

(75) Inventor: Rolf Truninger, Langendorf (CH)

(73) Assignee: Globemag L-P, Edinburgh (GB)

(*) Notice: Subject to any disclaimer, the term of this patent is extended or adjusted under 35 U.S.C. 154(b) by 0 days.

(21) Appl. No.: 09/577,430

(22) Filed: May 22, 2000

Related U.S. Application Data

(63) Continuation-in-part of application No. 08/785,334, filed on Jan. 16, 1997, now abandoned, which is a continuation of application No. PCT/CH96/00194, filed on May 17, 1996, and a continuation of application No. PCT/CH96/00054, filed on Feb. 19, 1996.

(30) Foreign Application Priority Data

May 16, 1995 (CH) .............................. 1420/95

(51) Int. Cl.[7] .............................................. B29C 45/82
(52) U.S. Cl. ........................................ 417/22; 264/40.1
(58) Field of Search ............................... 417/22; 60/431, 60/477; 92/134; 264/40.1, 40.3, 40.5, 40.7

(56) References Cited

U.S. PATENT DOCUMENTS

| | | | |
|---|---|---|---|
| 3,638,423 A | * 2/1972 | Van Heijst | 60/51 |
| 4,620,417 A | * 11/1986 | Wuchenauer | 60/431 |
| 5,052,909 A | * 10/1991 | Hertzer et al. | 425/150 |
| 5,093,052 A | * 3/1992 | Wurl et al. | 264/40.1 |
| 5,325,668 A | * 7/1994 | Walchhutter | 60/413 |
| 5,375,417 A | * 12/1994 | Barth | 60/370 |
| 5,486,106 A | 1/1996 | Hehl | 425/145 |
| 5,638,677 A | * 6/1997 | Hosono et al. | 60/431 |
| 5,687,567 A | * 11/1997 | Hansson et al. | 60/413 |
| 5,811,037 A | * 9/1998 | Ludwig | 264/40.1 |

FOREIGN PATENT DOCUMENTS

| | | | |
|---|---|---|---|
| CA | 2133150 | 4/1995 | B29C/45/67 |
| DE | 4335403 | 12/1994 | B29C/45/76 |
| EP | 0464286 | 8/1992 | B29C/45/82 |
| EP | 0574623 | 12/1993 | F04B/49/06 |
| EP | 0403041 | 8/1994 | B29C/45/82 |
| EP | 0649723 | 4/1995 | B29C/45/82 |

* cited by examiner

Primary Examiner—Charles G. Freay
Assistant Examiner—Ehud Gartenberg
(74) Attorney, Agent, or Firm—Cobrin Gittes

(57) ABSTRACT

A system that includes a pump driven by a variable speed electric motor, the pump being directly connected to a hydraulic actuator by an open hydraulic circuit. This setup allows using one motor pump combination to drive any number of axes sequentially. The main advantages are significant energy savings but also higher control quality achieved by the substitution of control valves. Power control is dedicated to electronic power transistors while hydraulics are used for power transmission. For two and four quadrant operation, a hydraulic accumulator is proposed exerting a spring load on the hydraulic actuator. This allows for driving and braking the actuator and the associated machine axis in both directions of motion while the hydraulic pressure is always applied to the same port of the pump. The other pump port can be connected to tank.

8 Claims, 8 Drawing Sheets

HYBRID ELECTRIC AND HYDRAULIC ACTUATION SYSTEM

CROSS-REFERENCE TO RELATED PATENT APPLICATIONS

This is a continuation-in-part of U.S. Ser. No. 08/785,334 filed Jan. 16, 1997 now abandoned and entitled "Device With At Least One Hydraulic Axis", which is a continuation of international application PCT/CH96/00194 filed May 17, 1996 and a continuation of international application PCT/CH96/00054 filed Feb. 19, 1996.

STATEMENT REGARDING FEDERALLY SPONSORED RESEARCH OR DEVELOPMENT

Not Applicable.

BACKGROUND OF THE INVENTION

1. Field of the Invention

The invention relates to a hybrid system built up with hydraulic and electric elements for motion control of dynamic machines. A cylinder linked to a pump by means of an open hydraulic circuit is used for power transmission while power control is dedicated to a variable speed electric motor.

2. Discussion of Related Art

The lasting use of resources has become a key issue in modern industrial development. There is increasing awareness, that air, soil, water and energy are limited resources. Strict laws regarding the use of energy and emissions of all kinds are generally implemented, and are already a decisive factor in the assessment of machines. This trend is going to become more pronounced in the future (Energy taxes, CO, emission taxes, ISO 14000, EC Machine Guidelines, etc.). With this in mind, it is important for hydraulic drive technology to improve energy efficiency and to offer solutions comparable to those of the competing electrical systems. Otherwise, certain applications constituting the strength of hydraulics could disappear.

A typical example are plastic injection molding machines, traditionally the domain of hydraulic drive technology. "All electric" machines are making an appearance on the market. Their main claim is energy consumption and control performance of machine movements. Since "all hydraulic" machines are also making progress in energy consumption, they have not yet been displaced from the market. The parallel existence of both drive types shows that there are arguments in favor of both sides.

The goal of the invention was to find a hybrid solution using the advantages of both drive technologies rather than following an "all hydraulic" or "all electric" approach. The solution found consists of a variable speed electric motor, a pump, an open hydraulic circuit and a hydraulic actuator such as a cylinder or a hydromotor. The invention shows only little differences when compared to similar concepts, but offers new features, which make it more efficient, more controllable and more versatile.

Hydraulic and electric actuators show very different properties. An advantage of hydraulic drive technology is the possibility for one motor-pump setup to share power with a multitude of actuators. In open hydraulic circuits, one pump supplies pressurized oil or other fluids to a multitude of actuators (please find a description of an open hydraulic circuit later in the text). Each actuator is assigned a valve controlling the motion of the respective axis. For certain machines only one electric motor is required even though the machine has multiple axes installed. This results in saving considerable costs compared to all electric machines that require one motor for every axis of the machine. For electric machines, power sharing is not as easy to achieve and therefore most often not applied.

High force concentration is another advantage of hydraulic technology. Electric motors and also linear motors generate much lower torque or forces than their hydraulic equivalent. Hydraulic motors and cylinders show about 10 times higher force to surface ratio (force concentration). This is due to the fact that different physical principles are behind electric and hydraulic forces. To achieve higher forces "all electric" machines often require additional transmission elements such as ball screws, gear boxes, belt drives or toggle mechanisms where as hydraulic actuators can act directly on the machine. This issue becomes an important factor for machines generating high forces such as presses or injection molding machines.

An advantage of electric drive technology is power control. Power transistors such as IGBT (insulated gate bipolar transistor) can switch on and off in as little as 100 nanoseconds ($10^{-9}$ sec). This is about 100,000 times faster than hydraulic valves where typical switching times are 10 ms ($10^{-3}$ sec). Fast transistor technology allows controlling electric energy with little losses. It also allows recuperating mechanic energy back into electrical energy. The associated drive technologies are state of the art and well known.

Hydraulic power control, on the other hand, is based on valves or variable displacement pumps. Hydraulic control valves are variable resistors changing the pressure drop in direction of the flow. This results in high losses of energy. Note that within the scope of this application we distinguish between control valves and on/off valves. Control valves can be understood as variable orifice allowing to control the flow supplied to an hydraulic actuator. The orifice causes resistance to the oil flow resulting in a pressure drop. The product of pressure drop and flow represents power losses inherent to this way of controlling power. On/off valves on the other hand are used to direct the flow from one line to the other or to switch the flow on and off. They can not be used to control the motion of a hydraulic cylinder or hydromotor. When "off", there is no flow through the valve, when "on" there is virtually no pressure drop in the valve as these valves do not hinder the oil to flow (no orifice effect). Accordingly, power losses are virtually zero, flow and pressure drop always multiply to zero. For this invention, I therefore tried to avoid the use of control valves while on/off valves do not waste energy and therefore can be used without restrictions.

Variable displacement pumps generate significant noise. It is known these elements show bad efficiency when only part of the power is required. When idle, the variable displacement pump driven by a constant speed motor still rotates full speed resulting in high idle losses.

The goal of the invention was to find a drive system combining the advantages of hydraulic and electric drive technology. The system must combine high force concentration, high efficiency and easy power distribution. It was also a goal of the invention to make the new drive system applicable to a wide range of dynamic machines such as flight simulators, robots, injection molding machines and presses or die casting machines. All of them need accurate and dynamic control of pressure and/or velocity and/or position.

BRIEF SUMMARY OF THE INVENTION

A hybrid electric and hydraulic system, comprising a variable speed electric motor, a pump, a hydraulic actuator, and an open hydraulic circuit that includes a tank, the motor being arranged to drive the pump to suction from the tank, the pump being in fluid communication with the hydraulic actuator so as to vary pressure and/or speed and/or position of the hydraulic actuator in accordance with a speed of the electric motor.

A hybrid electric and hydraulic system for the actuation of a dynamic machine axis, comprising a variable speed electric motor, a pump, an open hydraulic circuit that includes a tank, a hydraulic cylinder and a hydraulic accumulator, the motor being arranged to drive the pump to suction from the tank, the hydraulic cylinder having a piston movable between retracted and extended positions within the hydraulic cylinder, the pump being in fluid communication with the hydraulic cylinder on one side of a head of the piston, the hydraulic cylinder being in fluid communication with the hydraulic accumulator on another side of the head of the piston so that hydraulic energy routes to the accumulator as the piston moves in one direction and the accumulator supplies energy for effecting a reverse direction of motion of the piston.

BRIEF DESCRIPTION OF THE SEVERAL VIEWS OF THE DRAWING

For a better understanding of the present invention, reference is made to the following description and accompanying drawings, while the scope of the invention is set forth in the appended claims.

DETAILED DESCRIPTION OF THE INVENTION

As stated before, the goal of the invention is to combine the advantages of electrical and hydraulic drive technology. In so combining a drive concept becomes developed that is generally applicable to a wide range of machines with high dynamic requirements such as flight simulators, robots, injection molding machines and presses. These machines need dynamic pressure, speed and position control in both direction of motion. The position must be kept within the physical boundaries usually defined by mechanical stops. Dynamic machines use significant time (more than 10%) within the motion profile or cycle for acceleration or deceleration. Such dynamic machines stay in contrast to pump or fan drives where speed is changed slowly and kept constant for a long time compared to the acceleration phase. Typically such a low dynamic machine axis does not have any mechanical stops.

For purposes of this application, the expression "power control" encompasses pressure and/or speed and/or position control (or a combination thereof). These features are important to cope with the demand of "general applicability". Any limitation of a drive technology in terms of control or direction of motion would also limit the applicability on machines. For "general applicability" to dynamic machines, pressure control and bi-directional motion are a must. The invention provides a solution in this respect, highly dynamic and generally applicable while combining the advantages of the hydraulic and the electric drives and avoiding the corresponding disadvantages.

Figure 2:
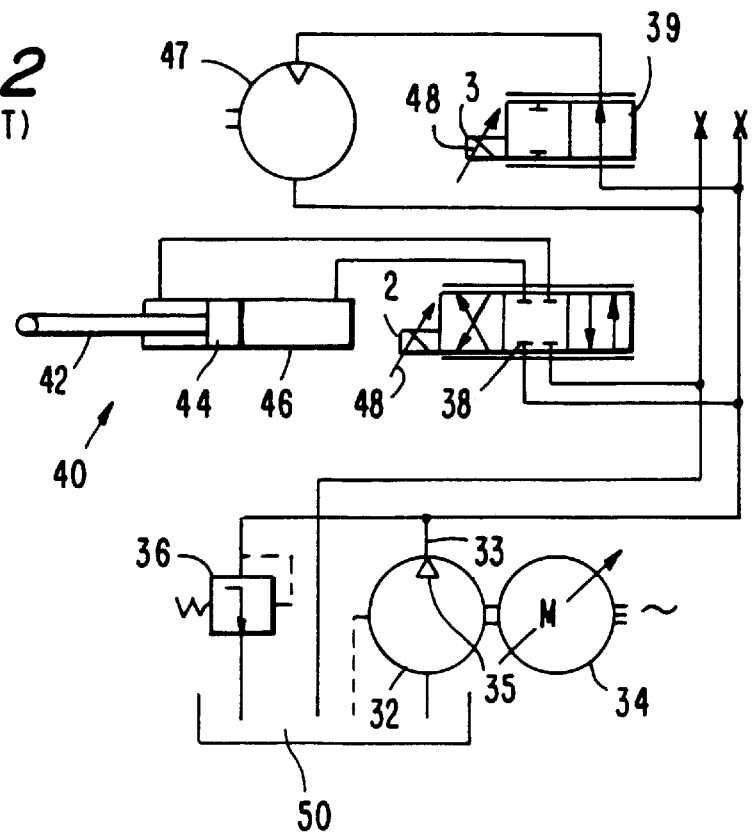
FIG. 2 is a schematic representation of a conventional hydraulic system based on a power pack providing constant pressure.
Figure 6:
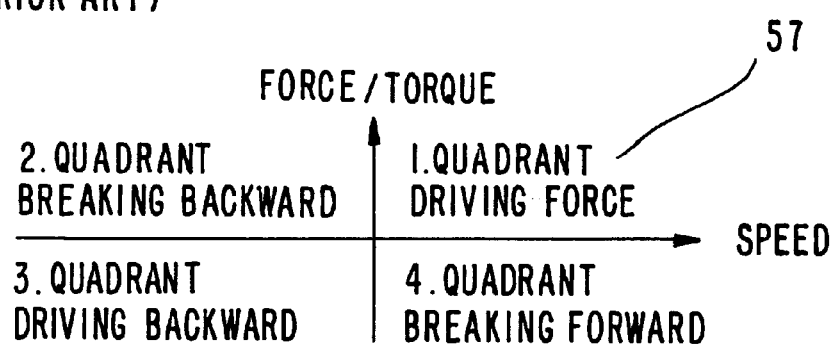
FIG. 6 is a diagram representing the four quadrants of motion.

Before discussing more details, reference is made to FIG. 2 and FIG. 6 showing a state of the art closed hydraulic circuit. The table below outlines the major difference between closed- and open hydraulic circuits.

| OPEN HYDRAULIC CIRCUIT (FIG. 2) | CLOSED HYDRAULIC CIRCUIT (FIG. 5) |
|---|---|
| Open hydraulic circuits are widely used to distribute the hydraulic power of a pump to a multitude of actuators such as cylinders and hydromotors. | Closed hydraulic circuits are widely used to transmit the hydraulic power of a pump to one dedicated actuator such as a cylinder or hydromotor. |
| A classical setup consists of a tank 50, a pump 32, a valve manifold (not shown in FIG. 2) and actuators 40, 47. In such a setup, the pump 32 sucks the oil from the tank 50 and feeds pressurized oil to the manifold where the power is distributed and controlled by a set of valves 38, 39. Depressurized oil returns to tank 50. | A classical setup consists of a pump 54 and an actuator 40. The pump 54 does not suck the oil from a tank. The return line 58 of the actuator 40 feeds the pump 54. Theoretically, there is no exchange of oil with a exchange of oil with a tank. Therefore, such circuits are characterized as "closed". |
|  | Note: Often auxiliary equipment is used to compensate for drain losses in the "closed" circuit and also to filter and cool the oil. |
| Typical application: Hydraulic press or injection molding machine. In the open circuit pump, the pressure port 33 is always the same. Therefore, there are no load reversals in the pump or in the motor shaft driving the pump. The arrow 35 in the pump symbol stand for one flow direction: the pressure is only applied to the port marked with an arrow 35. | Typical application: Wheel drive of an excavator. In a closed circuit pump 54, pressure can be applied on both ports 59. In general, there are load reversals in the pump 54 and in the motor shaft driving the pump 54. The four arrows 53 stand for two flow directions and pressure applied to both ports 59. |
| The pump suction port 37 is connected to tank 50. This allows supplying any cylinder. | The pump "suction" port is connected to the hydraulic actuator 40. Only symmetric cylinders having equal piston area on both sides of the piston 44 can be used, as the flow into the pump must be equivalent to the flow out of the pump. |

Closed hydraulic circuits with direct pump control of an actuator (cylinder or hydromotor) are conventional. The driven system can operate in both directions of motion. Conventional patented techniques reveal a servo motor driven pump for closed loop circuits. However, in these patents there is no information as to how the problem of controlling pressure should be solved, how multiple actuators can be driven with a single motor-pump setup or how an asymmetric cylinder could be driven. For the clamp up of a hydraulic injection-molding machine, the cylinders are built to match the high forces acting in one direction only. Accordingly, the corresponding cylinders have large cross sectional area on the pressure side and much smaller cross sectional area on the reverse side. Such asymmetric cylinders can not be driven with closed hydraulic circuits. Furthermore, pressure control is required to control the clamp up force.

Figure 1:
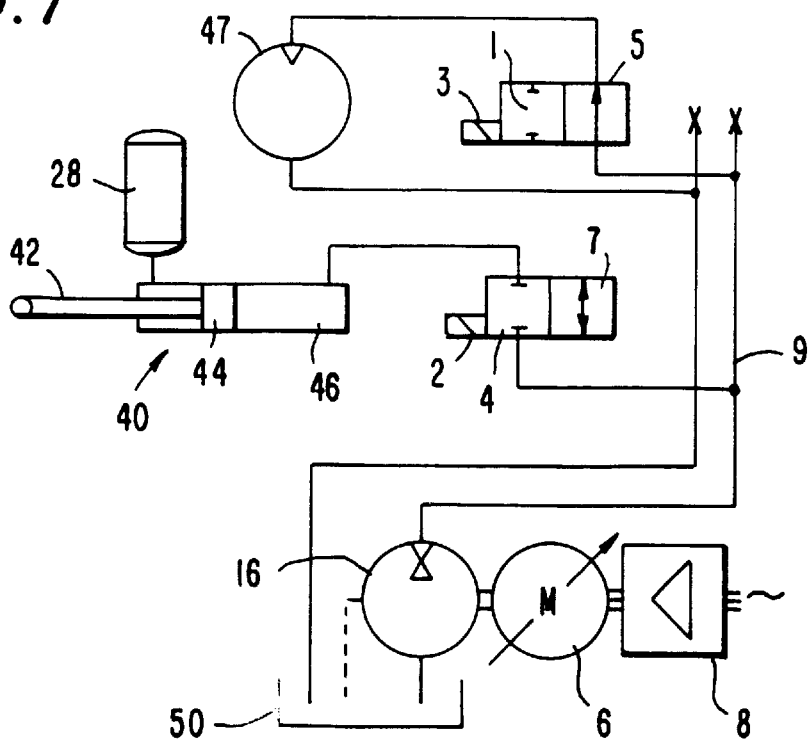
FIG. 1 is a schematic view of an hydraulic system where power control is dedicated to electrical control elements while power is transmitted by means of an open hydraulic circuit in accordance with an embodiment of the invention.

Turning to the drawing, FIG. 1 shows a hybrid electric-hydraulic system according to the invention. FIG. 2 shows a conventional hydraulic system based on a power pack providing constant pressure. A fixed displacement pump 32 driven by a constant speed electric motor 34 generates a constant oil flow. A pressure relief valve 36 controls the pressure. The pressurized oil is delivered through a multitude of control valves 38 and 39, each of them controlling a hydraulic actuator 40 and 47. The hydraulic cylinder 40 consists of a piston 44 moveable between retracted and extended positions within the cylinder chamber 46. The cylinder rod 42 is connected to a machine (not shown) forcing the machine axis to move. In the example above, the hydraulic actuators 40 and 47 represent such a multitude of actuators driving the machine. All axes of the machine can be controlled individually and simultaneously. The delivery of the pump 32 must be equal or larger than the sum of all flows required by the valves 38, 39 and associated actuators 40, 47. When idle, the full flow passes through the pressure relief valves 36 back to tank 50. Accordingly, all the hydraulic power generated by the pump-motor setup 32, 34 is lost. An advantage of the approach is that a low cost system with many actuators can be built up which allows for simultaneous motion of all axes.

Figure 3:
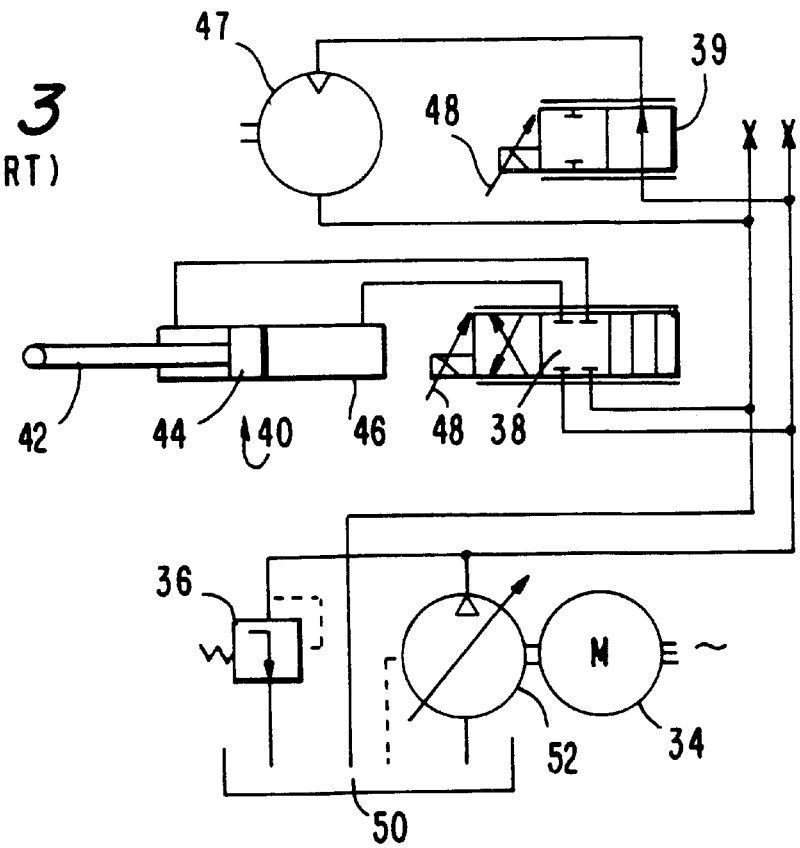
FIG. 3 is a schematic representation of a conventional hydraulic system based on a power pack providing constant pressure.

Unlike FIG. 2, in FIG. 3, a variable displacement pump 52 allows adaptation of the pump flow to the actual consumption. This allows reduction of the pressure relief valve 36 oil flow and therefore saves power. The philosophy of distributing power to different actuators 40, 47 is unchanged. One hydraulic power source provides pressurized oil for a multitude of valves 38, 39. Hydraulic valves 38, 39 control the actuators 40, 47 driving the machine.

Figure 4:
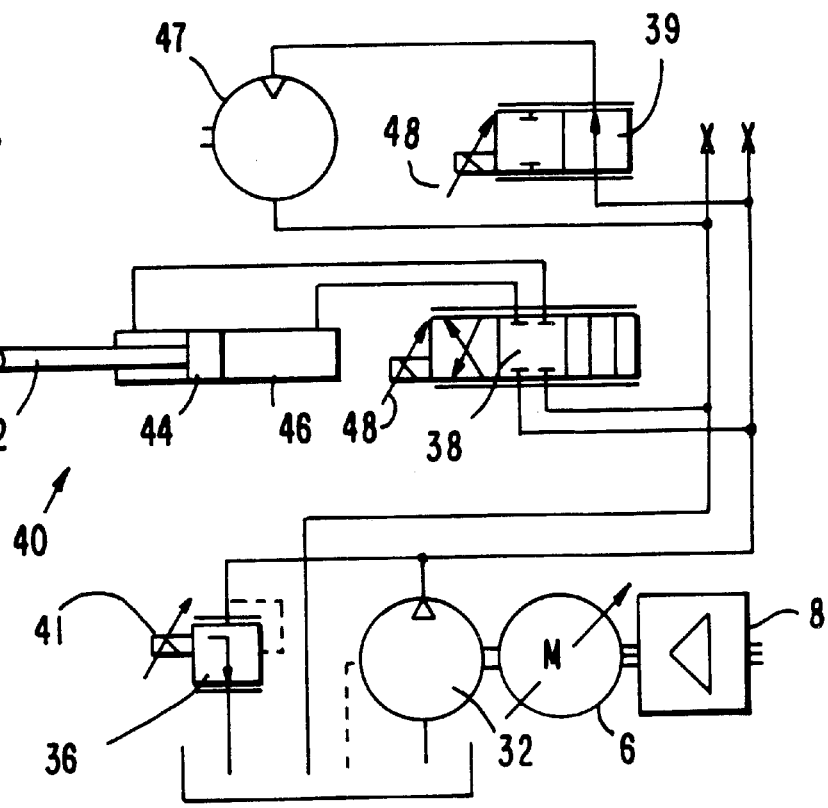
FIG. 4 is a schematic representation of a state of the art hydraulic system.

In FIG. 4, the pressure relief valve 36 can be controlled, unlike FIGS. 2 and 3. This is symbolized by the proportional actuator 41 acting on the relieve valve 36. The pump pressure in the system is not kept constant. Pressure is adapted to the actual loads on the actuators 40,47. The average pressure and accompanying power losses are reduced. Furthermore, the variable displacement pump 52 (FIG. 3) has been replaced by a variable speed fixed displacement pump 54. A standard variable displacement pump 52 (FIG. 3) causes significant losses when little or no flow is required as motor 34 (FIG. 3) and pump 52 (FIG. 3) are still running full speed. The reduction of speed helps to save additional energy. Pressure control is done by means of hydraulic control elements. Like in FIGS. 2 and 3, the pump supplies oil to a multitude of valves 38, 39, simultaneously controlling the hydraulic actuators 40, 47 of a machine.

Figure 5:
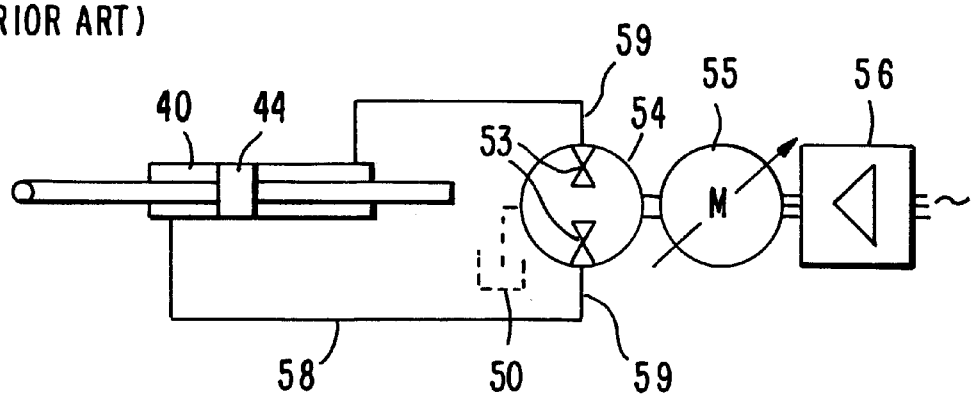
FIG. 5 is a schematic representation of a conventional closed hydraulic circuit

The closed hydraulic circuit of FIG. 5 is called "closed" because there is no exchange of fluid with other circuits or a tank 50. The pump motor set up 54, 55 is dedicated to one actuator 40 only. Like all-electric machines, this concept requires one motor 55 and drive 56 for every axis of the machine, as power is difficult to share. Additional hardware is required to compensate for drain losses and also to cool and filter the oil.

With respect to the four quadrants of motion shown in FIG. 6, a specific motion can be characterized by the direction of speed and force or torque. If speed and force are positive, the actuator is driving the machine. Accordingly, the actuator□s point of operation is in the upper right quarter 57 of the speed-force diagram. Such a motion is called "one quadrant" motion. If the actuator can also break a machine (negative forces, positive speed) the actuator can be characterized as "two quadrant". The most general actuator can break and drive the machine in both directions of motion. This is referred to as a "four quadrant" actuator. Force and speed can be positive or negative; the respective point of operation can lie within any of the four quarters of the speed-force diagram. For general applicability of an actuator to a machine, it must show "four quadrant" properties.

Figure 7:
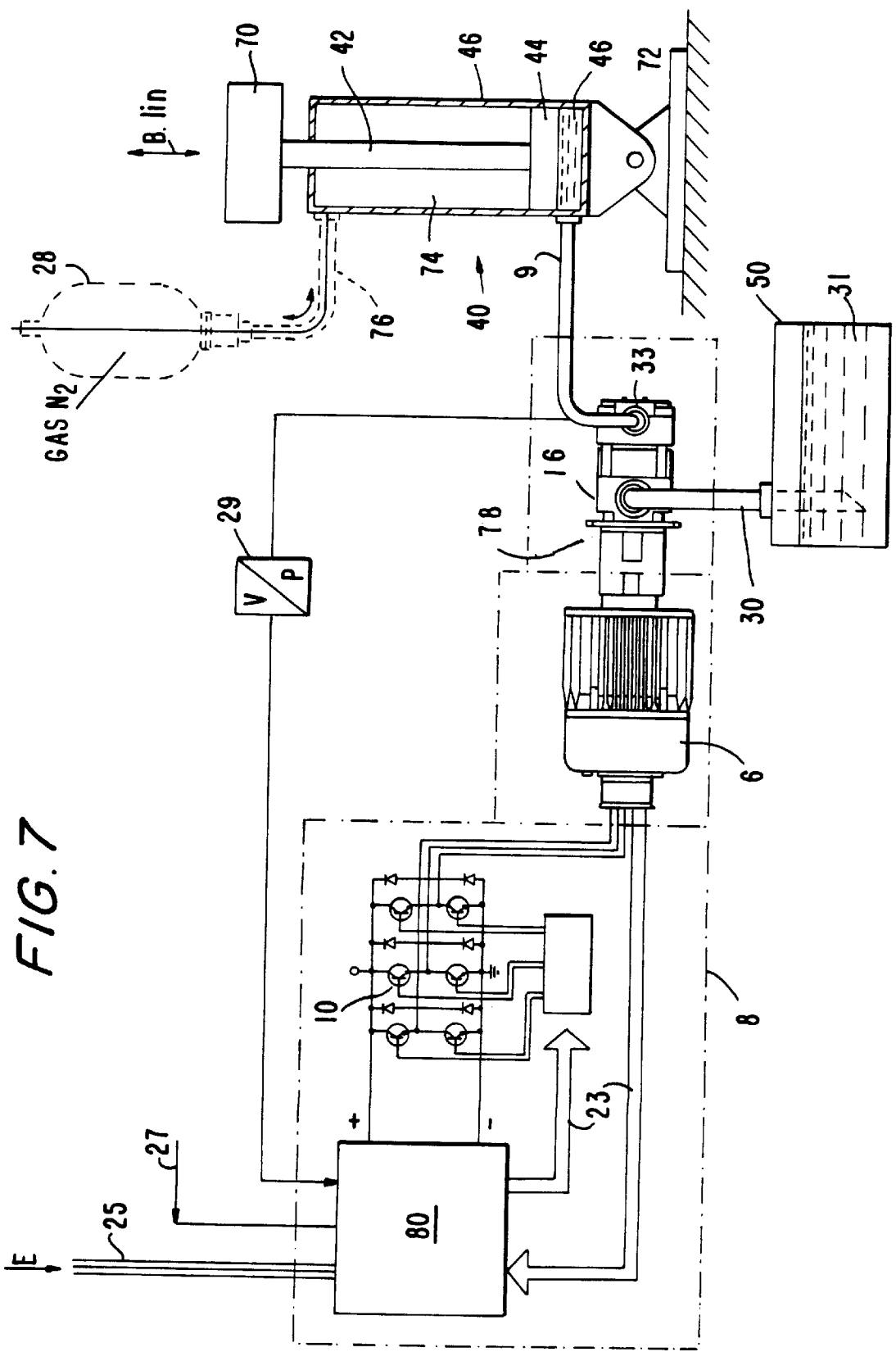
FIG. 7 is a schematic representation of a hydraulic system of FIG. 1 in more detail showing a cylinder driven in accordance with an embodiment of the invention.

On first sight, the invention of FIG. 1 might not look very different from conventional techniques (see FIGS. 2–6). However, there is no arrow 48 going through the valve actuators 2 and 3, which indicates that the valves 4, 5 have no control function. The invention is characterized by strictly electrical power control. This is achieved using a variable speed motor 6 driven by an electric drive 8. A set of electronic power transistors housed in drive 8 generate the currents energizing the coils of the motor 6. The motor 6 itself as well as the pump 16 and linked hydraulic actuator 40, 47 are passively transforming the electric energy into hydraulic and mechanical energy, respectively. They do not have any control function and can be compared to a gearbox of a standard electro-mechanical setup. Hydraulic pressure and flow of the pump 6 is directly controlled by the power transistors without the use of hydraulic control elements such as proportional valves or variable displacement pumps. If the valve actuators 2 and 3 are switched on, valve 5 is switched into the off-position 1 while valve 4 is switched into the on-position 7. This results in a bi-directional hydrostatic link of the cylinder 40 to the pump 16 without any interference of hydraulic control elements. The hydraulic motor 47 is switched off and therefore can be neglected as only the hydraulic cylinder 40 is moving. FIG. 7 shows in more detail the relevant elements involved.

The hydraulic pump 16 suctions a hydraulic medium 31 from a tank 50 via suction line 30 and supplies pressurized fluid to the pressure line 9 and to the hydraulic actuator 40. The actuator 40 consists of cylinder 46, piston 44 and piston rod 42. Part 70 represents the actuated machine axis linearly displaced in relation to a fixed point 72 of the machine. The pressure fluid 74 on the other side of the piston 44 can expand through an exchange line 76 into an accumulator 28. The pressurized fluid 74 exerts a spring load on the piston 44 resulting in a positive pressure in the cylinder chamber 46. The hydraulic pump 16 is powered by a variable speed motor 6 mechanically coupled to the pump 16 by means of a coupling 78. The drive 8 supplies power to the electric motor 6. The drive 8 consists of a set of power transistors 10 controlling the currents to the motor 6 and a controller 80.

The controller 80 supplies DC Voltage and controls the power transistors 10. The controller 8 also has means to store electric energy and/or means to feed recuperated energy back to mains 25. Signal lines 23 are used to input measured parameters of the system to the controller 80 such as for example rotary angle, speeds, currents or voltage of the motor 6. The output signal line 23 of the controller is used to control the switching of the power transistors 10. Signal line 27 represents a connection to the machine controls such as a PC where the motion commands for the cylinder 40 and for the machine axis are received. The pressure sensor 29 is also connected to controller 80 and allows for pressure control of the cylinder 40. Not shown is a position sensor of the cylinder 40 used for position control.

In the example illustrated, energy is converted several times. First of all, the energy taken from the mains 25 (alternating current) is converted into direct current. Simultaneously, the power transistor 10 or electronic element generates the electromagnetic field in the motor 6. The motor 6 converts the energy into corresponding mechanical energy driving the shaft of the pump 16, which produces hydraulic energy at the pressure port 33 of the pump 16. The pump suctions fluid 3 from tank 50 and supplies it directly to the chamber 46 of the hydraulic cylinder 40. The piston 42 moves accordingly, resulting in a controlled motion and force on the machine axis 70. Hydraulic energy is converted back to mechanical energy supplied to the machine axis. Hydraulic pressure and flow are dynamically controlled by the rpm of the motor. A system according to FIG. 7 allows to dynamically control the machine motion in 4 quadrants of motion. No hydraulic control elements such as proportional valves (throttle or orifice principle) or valves to change the direction of motion are used. The whole motion is controlled by electronic power transistors 10 and transmitted to the machine by means of a motor 6, pump 16 and cylinder 40 arranged in an open hydraulic circuit.

Figure 8:
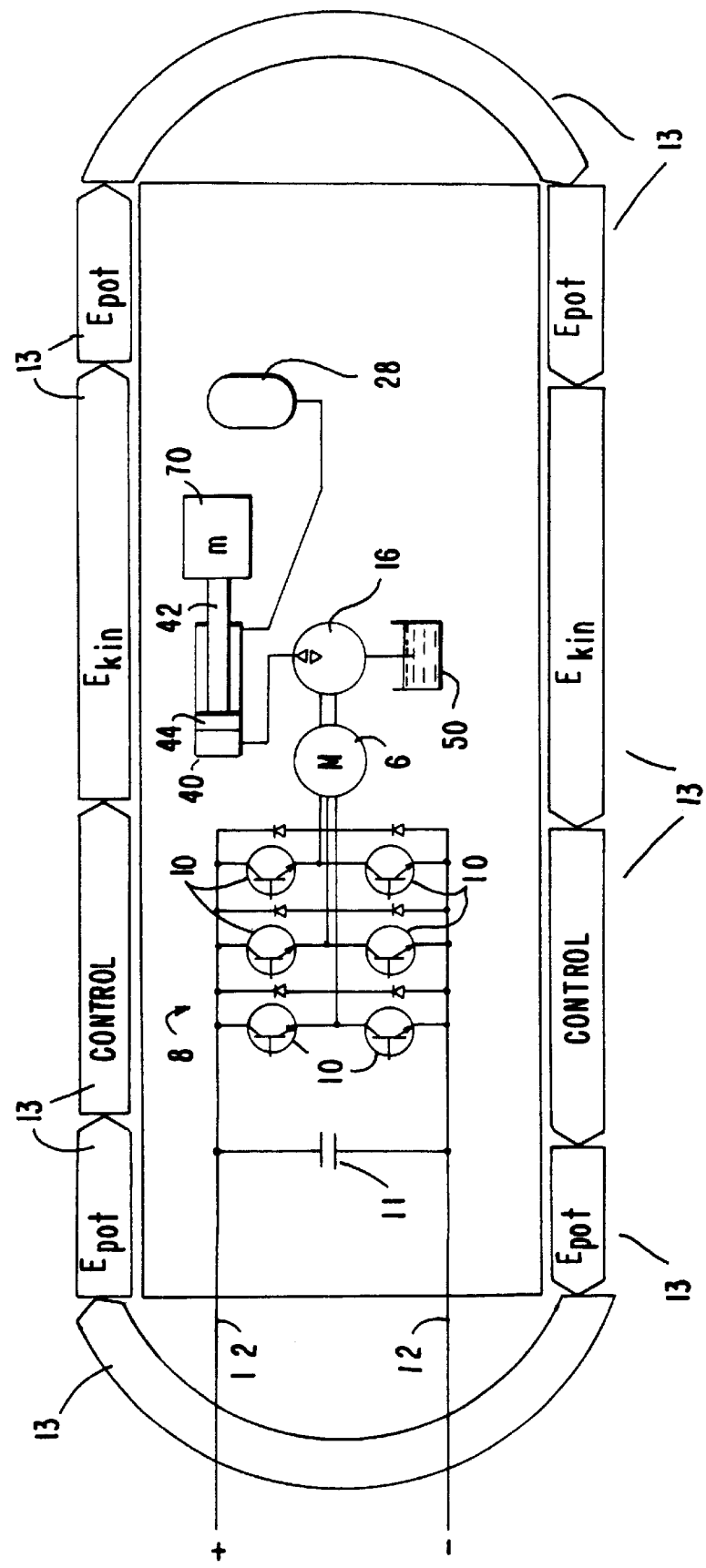
FIG. 8 is a schematic representation of an electro-hydraulic oscillator (EHO) that illustrates the operating principal and energy flow.

The "little" change from FIG. 4 to FIG. 1 has major impacts on the system and its components. One major change is the energy losses, which can be reduced significantly. This becomes apparent when having a closer look at the energy flow in FIG. 8. A hydraulic accumulator 28 is used to achieve 4-quadrant operation of the cylinder 40. When the cylinder 40 moves cyclically in and out, the associated energy in the system components also follows a cycle indicated by the arrows 13. The energy cycle corresponds to an oscillator such as a pendulum and the set up is referred to as an electro-hydraulic oscillator (EHO) because energy is cyclically transformed from potential into kinetic energy and back.

Moving out the cylinder rod 42 has the following effect for the different components of the system. Let us assume the capacitance 11 is loaded and the voltage of DC-Bus 12 is nominal. The capacitance 11 represents stored electrical energy. Upon start of the motion, the transistors 10 start to control the motor 6 and electric energy is converted into motion. Motor 6, pump 16, cylinder rod 42 and load 70 move simultaneously and represent a single inertia and associated kinetic energy. When the cylinder rod 42 moves out, oil on the backside of the piston 44 is displaced and forced into the hydraulic accumulator 28. When the motion stops, there is no more kinetic energy; all the energy involved in the motion is transferred from the capacitance 11 to the hydraulic accumulator 28. When the cylinder retracts, the hydraulic accumulator 28 □pushes□ the piston 44 back. The oil moves back to tank 50 and the hydraulic pump 16 acts like a hydraulic motor. The variable speed motor 6 works as a generator and the transistors 10 store the energy back to the capacitance 11, buffering the DC-Bus 12. More recent drives allow feeding the energy directly back to mains, thus a DC-Bus 12 is no longer required. Therefore, the mains can replace the DC-Bus function of storing energy.

The above motion cycle converts potential energy to kinetic energy and back, potential energy being electric on one side and hydraulic on the other side. This corresponds to an oscillator such as a pendulum, where energy is also transferred from potential energy to kinetic energy and back. We therefore call a setup according to FIG. 8 "electric hydraulic oscillator (EHO)". Theoretically, the EHO should not require an additional energy supply. Of course, in practice there is no ideal pendulum. Inevitably, energy transformation causes losses, which must be returned to the system. However, this very advanced handling of energy results in high efficiency. A chain of high efficiency components defines the system losses. The losses must be compensated by the DC-Bus or mains supply.

An EHO-system does not require any hydraulic control elements. As discussed before, hydraulic control valves are based on the orifice principle throttling the oil flow and generating major energy losses. Another disadvantage to valves in general is their discontinuity in the low signal range when oil changes direction. This tends to cause significant hysteresis in position, speed or pressure and results in unpredictable system behavior. This issue becomes apparent when a variable displacement pump is used to drive a cylinder, the direction of motion being changed by a directional valve. Such a setup in general does not match the requirements of dynamic machines. The EHO-system, on the other hand, shows no discontinuity when the direction of motion or force is changed. The seals of the cylinder are the only element to cause potential hysteresis; however such hysteresis is not significant in most practical cases.

Figure 9:
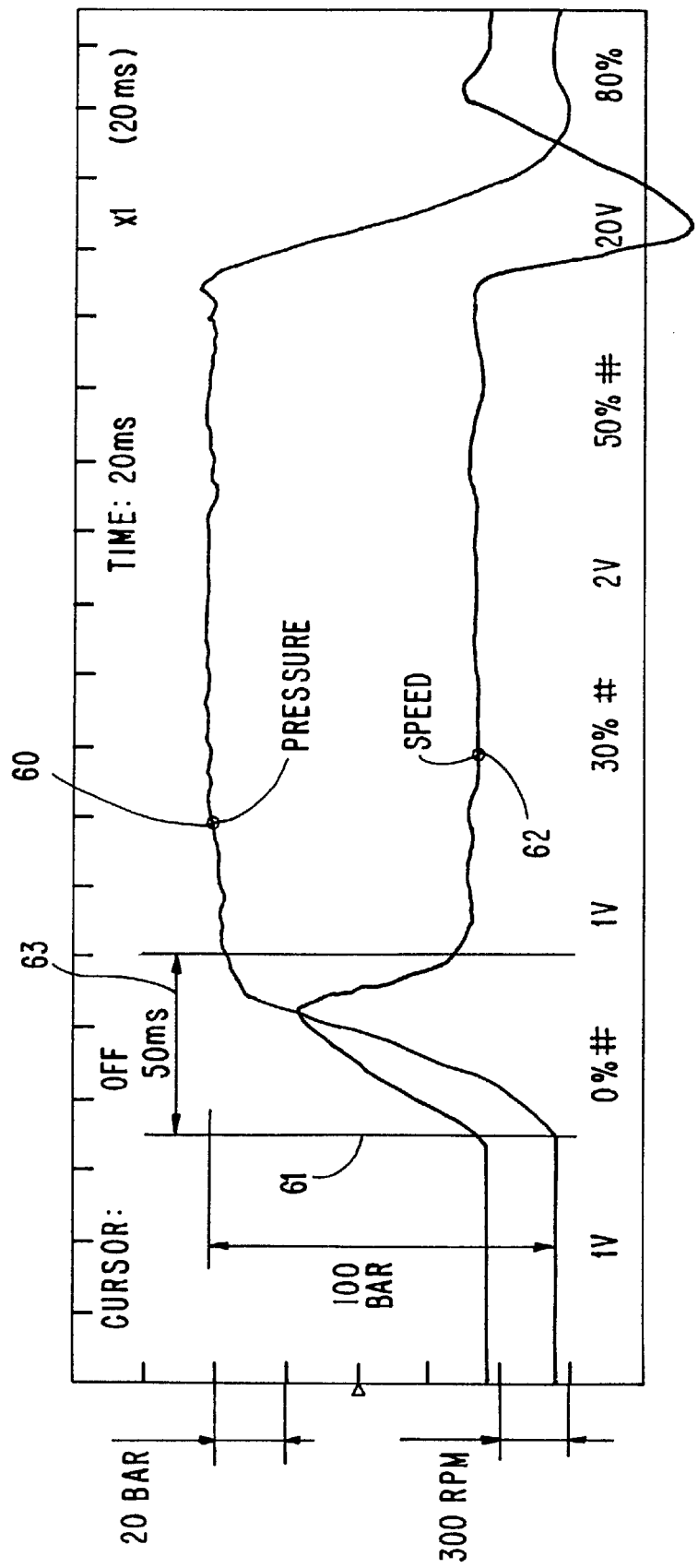
FIG. 9 shows the pressure and speed signal associated to the pressure control of a cylinder drive in accordance with the invention.

Different tests have been conducted with EHO systems. Naturally the dynamics are important. The question how the servo pump compares with the known valve technologies is of particular interest. FIG. 9 shows the pressure 60 and speed curves 62 following a set pressure step of 100 bar 61. The experimental setup corresponds to the system shown in FIG. 8. The cylinder was pressed against a mechanical stop. There was no motion involved, only pressure was controlled. The pressure build-up exhibits the desired profile free of overshoot and lasts 50 ms 63. To achieve this fast response with standard hydraulic control components, the use of very fast control valves such as servo valves would be imperative. The experiment proved pressure can directly be controlled by a motor-pump setup and the dynamics of very fast valves can be achieved. The oil column between the pump stage and the piston base is compressible, a certain volume of oil must therefore be conveyed to build up the pressure. If the oil column were modeled rigidly, the pressure control would correspond to a torque control of the motor. The example shows that the system cannot be modeled rigidly. Experiments carried out by the inventors have proven that torque control of the motor results in poor dynamics or strong pressure oscillations.

To build up pressure according to FIG. 9, the motor needs to accelerate using maximum torque. Deceleration of the motor must start in the middle of the pressure rise also applying maximum torque. On reaching the pressure, the motor turns at low speed required to compensate the internal leakage of the pump. PID-type control results in significant overshoot of pressure as the motor inertia keeps building up pressure when set pressure is reached. For this reason the invention is also based on research in controlling an EHO system.

The volume flow of the pump must be limited to achieve the results shown in FIG. 9. This corresponds to a certain speed limit of the motor when building up pressure. This speed limit is a function of elasticity of the oil column trapped between pump and cylinder piston. Further parameters of influence are the dynamics of the motor (inertia and maximum torque) as well as the load represented by the actual pressure. In order to avoid overshooting of the pressure the following speed limit must be given:

$$Q_{set} = \pm k * \text{Sqrt}[(P_{set} - P_{act}) * V_0 * k_c]$$

$k = M_{Max} \, q/(I*\pi)$ $Q_{set}$: maximal pump flow to achieve pressure rise without overshoot $M_{Max}$: maximal motor torque $P_{set}$: set pump pressure acting on cylinder $P_{act}$: actual pump pressure acting on cylinder q: pump displacement volume per revolution I: polar inertia of motor and pump $V_0$: enclosed (trapped) volume of oil $k_c$: coefficient of compressibility of oil FIG. 9 shows pressure control of a cylinder. Position control on the other hand requires means to provide speed or position feedback to the controller. The controller calculates the set values for speed or torque of the electric motor based on speed or position error of the cylinder. These set values are fed to the motor controller in drive 8 controlling the motor currents accordingly. In general, sophisticated control of position and/or force of an EHO require position and pressure feedback. However, the pressure feedback could be substituted in systems where pressure control is not required or when using the motor current feedback to calculate the pressure in an indirect way.

Figure 10:
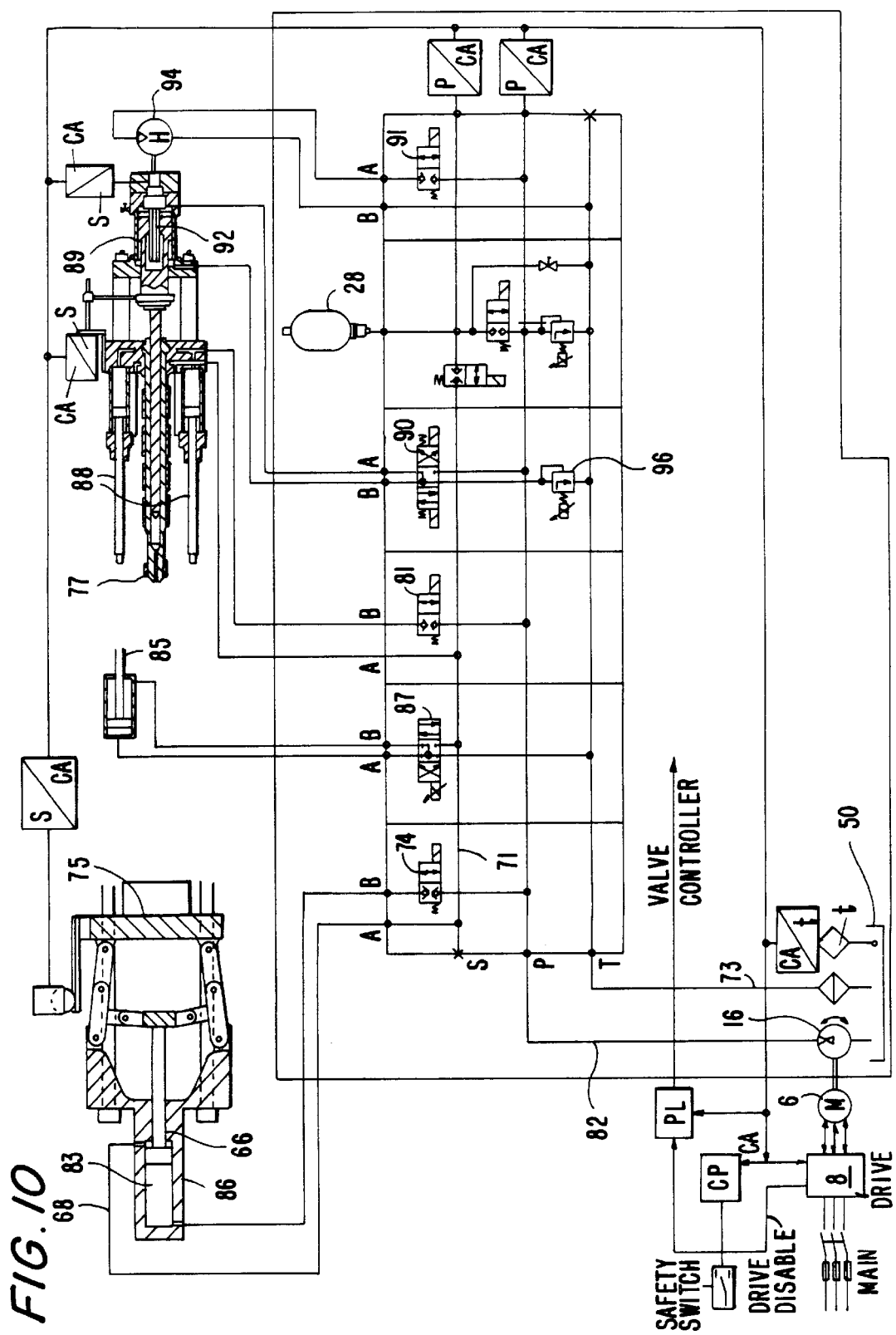
FIG. 10 is a schematic representation of an injection-molding machine.

A question arises as to how this drive concept can be used consistently in a machine. FIG. 10 shows the schematics of an injection molding machine. A single pump 16, tank 50 and hydraulic accumulator 28 are shared between all axis of the machine. These resources are accessed connecting the hydraulic actuators to the respective supply lines. Pressure line 82, accumulator line 71 and tank line 73 can be connected to each actuator using associated valves 74, 87, 81, 90, 91. An EHO system is implemented for the cylinders 86 and 88 driving the clamp 75 and the nozzle 77 of the extruder. Note that clamp 75 and nozzle 77 are standard components of an injection molding machine known to people familiar with these machines. Please also note that cylinders 88 are two cylinders working in parallel in order to achieve symmetrical force on the nozzle. Hydraulically they act like one single cylinder. The small cylinder chamber 66 of the mold cylinder 86 is connected to the accumulator 28 via hydraulic line 68 and accumulator line 71. The large cylinder chamber 83 is switched onto the pump line 82 using on/off-valve 74. This allows controlling pressure or dynamic motions in both directions according to the invention. Drive 8 and its transistors control power while motor 6, pump 16 and the open hydraulic circuit (the hydraulic lines involved) passively transmit power.

In FIG. 10, an open hydraulic circuit is used for power transmission from the servo motor pump to several axis of the machine. The valves 74, 81, 91 assigned respectively to the actuators for the clamp 75, injection nozzle 77 and screw drive 94 do not control the motion, neither in direction nor in speed. They only switch the power and control of the motor-pump setup to different axis of the machine. As a result, the relevant axis can not run simultaneously such as the ones driven with state of the art open hydraulic circuits. The valves sequentially switch controlled power from one actuator of the machine to another. Therefore, the valves can be compared to clutches in all-electric machines. A clutch connects the driven shaft with the electric motor but does not control the motion itself, neither in direction nor in speed.

Cylinder 85 provides additional hydraulic functions of the machine. A standard control valve 87 connected to tank line 73 and to the hydraulic accumulator line 71 controls the motion of the cylinder in both directions. Thus, the cylinder 85 is not driven according to the invention, it uses conventional valve control based on a tank line 73 and a pressure source, in this example supplied by the accumulator 28. The pump 16 does not control cylinder 85 allowing it to run in parallel to all other axis of the machine. This does not interfere with the EHO-axis. The example shows that the principle of actuation according to the invention can be mixed with standard hydraulic technology. This makes sense when only little energy is involved for a particular axis of the machine and when such an axis must run simultaneously to the axis driven according to the EHO principle. In such a case, the investment of an additional motor-pump unit might not be justified.

Cylinder 89 is used to inject plastic into the mold and holding pressure. This requires dynamic power control. The associated motion and forces act in one direction only (1 quadrant motion). Accordingly, no spring load is required on the backside of the cylinder. For injection, valve 90 switches to a position that connects pump 16 with cylinder 89. This results in full electric control of pressure and motion.

In the example shown in FIG. 10, the piston 92 can be pushed back to its injection position by the extruder screw that is driven by the hydraulic motor 94. This is achieved by switching valve 90 back to its neutral position after injection. Back pressure is built up using hydraulic valve 96 for pressure control. Injection is actuated by a system according to the invention while standard valve control is used for retraction of the extruder screw and the injection cylinder 89. Electric power control does the job in the injection phase of the machine. Control of the axis is handed over to standard hydraulic circuitry after injection. This task sharing of standard hydraulic control and electric power control according to the invention is an interesting solution as little energy is involved when retracting the extruder screw. The pump 16 can be used to drive the screw motor 94, allowing back pressure control and screw drive to run in parallel.

The extruder drive does not need to be hydraulic. A standard electro-mechanical setup using a second electric motor and a gearbox dedicated to drive the screw represent an alternative solution.

Electronic control elements provide handling advantages, such as improved standardization, easier integration in the machine controls, superior repeatability and temperature stability. For multiple axis machines, not all axes of the machines need to be driven according to the invention. For some axis, it might be advantageous to use standard hydraulic- or electro-mechanical drive technology. Actuation systems according to the invention can be combined with both; standard electric and hydraulic drives. This results in very versatile actuation taking advantage of the strength of the different technologies rather than following an "all hydraulic" or "all electric" approach.

Figure 11:
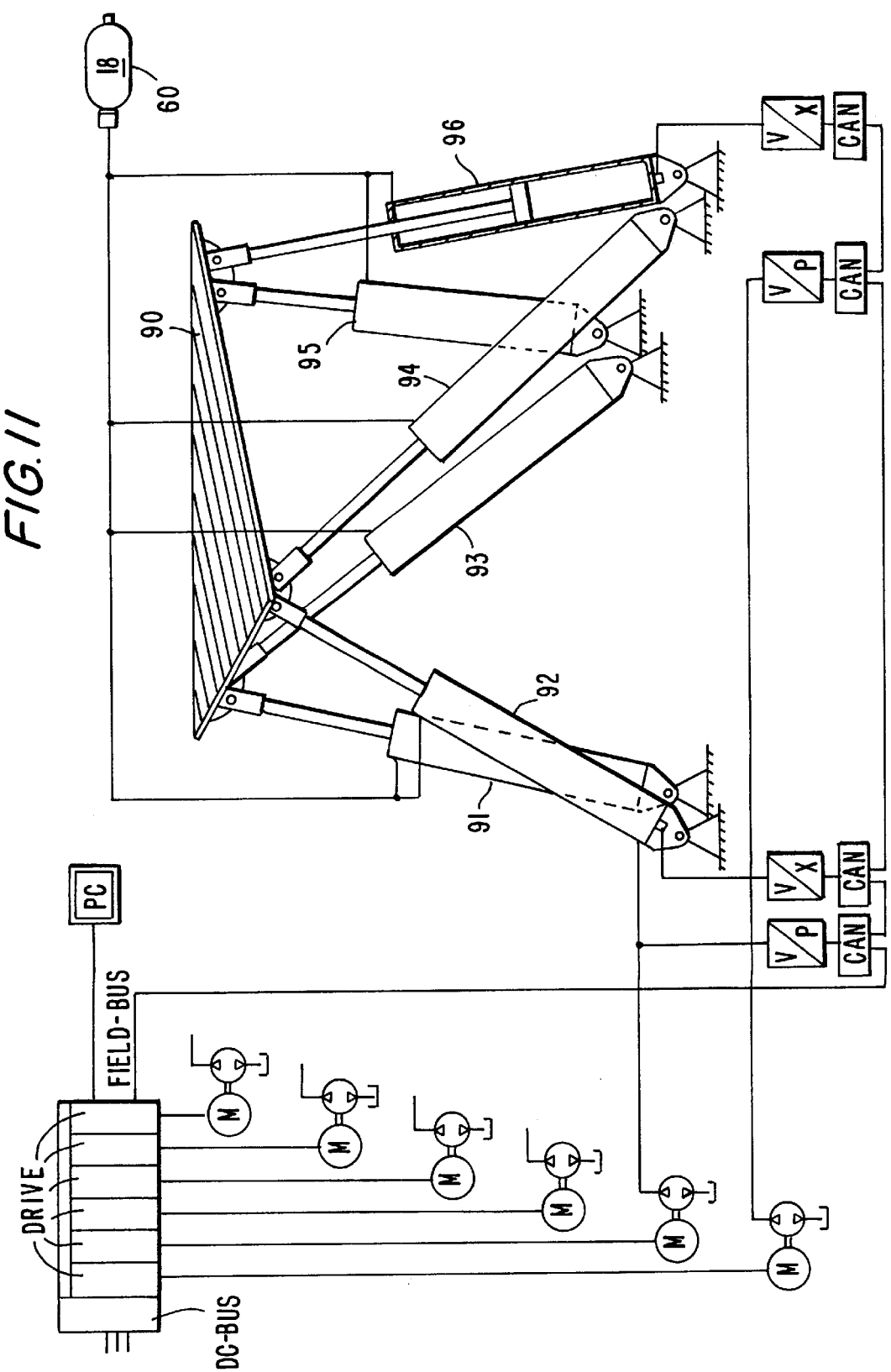
FIG. 11 shows a so-called steward platform widely used for machines such as flight simulators.

The use of an open hydraulic system allows for power sharing. Reference is made again to FIG. 10. The pump 16 sucks oil from tank 50 and supplies the axis clamp cylinder 8, nozzle cylinder 88, injection cylinder 89, screw drive 94 as well as the accumulator 28. The corresponding valves connect the pump to the respective actuators allowing the variable speed motor to control the power of one hydraulic actuator at any time. The hydraulics act like a hydrostatic gear box linking the different axis with the motor. This allows sharing high performing and expensive control elements between a multitude of actuators. They do not only share power but also power control. One drawback of the approach is the direct link between the controlled actuator and the motor-pump setup. Of course, one motor-pump setup can not serve several actuators at a time. The approach implies that axis driven according to the invention do not need to run simultaneously. This holds true for injection molding machines where injection, clamp and the nozzle do not need to run in parallel. For cycle time windows when no axis is driven, the motor-pump setup can be used for standard hydraulic jobs such as loading accumulator 28. In FIG. 11 we will explain how the approach can be extended to machines with parallel motion of the machine axis.

The approach of the invention is not only demanding in terms of control engineering but also requires unusual properties for pumps. Up until now, it was not believed possible to drive pumps such as internal gear pump at very low speeds while holding pressure. According to the invention, the pumps act directly on the actuator. If the concept is applied to a press or injection-molding machine, the pumps must be able to hold pressures at zero flow. This results in high loads at low speeds for all the bearings in the pump. Internal gear pumps therefore need hydrostatic bearings to make sure this mode of operation does not result in higher wear of the pump. The pump represents a key component in the above system. It is operated in the whole field of rotational speeds in both directions under any pressures. Any restriction within the speed or pressure range would restrict the area of application of the whole drive. Mixed friction in the bearing and the corresponding wear is to be expected in this operating mode. The shaft speed may drop to zero under load when the cylinder retracts slowly.

The development of pump technology suited for use with the invention was another key for the realization of the invention. So far, internal gear pumps were not considered to allow for low speed at high pressure operation.

The goal of electric power control and hydraulic power transmission is achieved for the most common hydraulic actuators such as asymmetric cylinders and hydraulic motors. Closed loop hydraulic circuits require symmetric actuators. The invention transforms an open hydraulic circuit into a hydrostatic gearbox of a variable speed electric motor. Control valves and variable displacement pumps are substituted. This allows electrically controlled power to be brought with easy means to a multitude of actuators running sequentially. The pump is always linked to one specific actuator at a time. The system is dynamic enough to drive presses, flight simulators or all axis of an injection molding machine. Indeed, energy efficiency and high dynamics of electrical control is combined with high force concentration and robustness of hydraulic power transmission.

Four quadrant operation, high efficiency and low hysteresis can be achieved without compromising the dynamics of state of the art technology. Power share allows building up machines with only one motor-pump setup as opposed to "all electric" machines having one motor for every axis of the machine. This saves money and also adds to the robustness of the machines, because transmission elements related to electrical machines such as toggles, gearboxes or ball screws, do not match the robustness and compactness of hydraulic actuators. As control is dedicated to electric drive technology the control performance and energy consumption matches or exceeds the performance of electric drives.

As concerns the steward platform of FIG. 11, all six axes 91, 92, 93, 94, 95, 96 must be driven simultaneously. Platform 90 must be able to move and rotate in all directions of motion requiring a simultaneous and coordinated motion of all 6 cylinders. Therefore, power sharing can not be done according to the examples above. A drive approach according to the invention might still be interesting to make use of the compactness and robustness of hydraulic power transmission and also in order to reduce energy losses associated with standard hydraulic control. To achieve parallel motion of all axis of the machine, one motor-pump set up is used for each actuator of the machine. All the drives share a common DC-Bus energized by one central rectifier only. This allows exchanging energy between the different drives and saving hardware costs. In this example, a single hydraulic accumulator is used to impose a spring load on all cylinders. Furthermore, a fieldbus is used for the controller to access the sensors for pressure and position in each cylinder. Additional sensors, such as motor speed feedback and oil temperature, are not shown and neither are safety valves that needed to stop the platform in case of failure. A processor or controller is used to handle the task of controlling the motion and coordination of all axes. Such a controller can be integrated in the drive hardware or run on an external PLC or similar control hardware.

What is claimed is:

1. A hybrid electric and hydraulic actuator system for the actuation of a dynamic machine axis, comprising a variable speed electric motor, a pump, a hydraulic actuator, and an open hydraulic circuit that includes a tank, the motor being arranged to drive the pump to suction from the tank, the pump being in fluid communication with the hydraulic actuator so as vary pressure and/or speed and/or position of the hydraulic actuator in accordance with the speed of the electric motor without the use of control valves, the hydraulic actuator being arranged to actuate the dynamic machine axis.

2. A hybrid electric and hydraulic actuator system comprising a variable speed electric motor, a pump, an open hydraulic circuit that includes a tank, a hydraulic cylinder and a hydraulic accumulator, the motor being arranged to drive the pump to suction from the tank, the hydraulic cylinder having a piston movable between retracted and extended positions within the hydraulic cylinder, the pump being in fluid communication with the hydraulic cylinder on one side of the piston, the hydraulic cylinder being in fluid communication with the hydraulic accumulator on another side of the piston so that hydraulic energy routes to the accumulator as the piston moves in one direction and the accumulator supplies energy for the reverse direction of motion of the piston.

3. A system according to claim 2, wherein a machine axis is connected to the open hydraulic circuit and operative in two quadrants of motion by the hydraulic actuator without the use of control valves.

4. A system according to one of the claims 1 to 3, further comprising a sensor for pressure of the hydraulic pump, the sensor being configured to generate signals indicative of the pressure; and a process computer that controls the speed of said motor based on the signals.

5. A system according to one of the claims 1 to 3, further comprising at least one safety valve in the open hydraulic circuit that is designed as an on/off valve and is arranged to stop the hydraulic actuator independent of the electric motor and pump.

6. A hybrid actuation system according to one of the claims 1 to 2 further comprising any one of a robot, a machine tool, an injection molding machine, a die casting machine, a press, a testing machine, a steward platform or an other dynamic machine, in which at least one axis is driven by the hydraulic actuator.

7. A hybrid actuation system according to one of the claims 1 to 2 wherein the pump is a gear pump with internal or external gearing with or without gap compensation, a constant or variable displacement axial or radial piston pump, a constant or variable displacement vane pump, a screw pump or an other hydrostatic displacement unit.

8. A hybrid actuation apparatus, comprising:

an open hydraulic circuit that includes a tank;

a pump in fluid communication with the tank;

a variable speed electric motor arranged to drive the pump to suction from the tank;

a hydraulic actuator in fluid communication with the pump;

a hydraulic accumulator in fluid communication with the hydraulic actuator, the hydraulic actuator having a piston movable in one direction in response to pressure provided by the pump that exceeds pressure of the hydraulic accumulator and is movable in an opposite direction in response to pressure provided by the hydraulic accumulator when the pressure from the pump is less than the pressure of the hydraulic accumulator;

sensors that sense parameters of the open hydraulic circuit and hydraulic actuators; and a controller configured and arranged to vary a speed of the electric motor based on the parameters that are sensed by the sensors.

* * * * *